May 17, 1960 C. F. WILLEY 2,936,532
SCORING DEVICE AND METHOD
Filed June 2, 1958
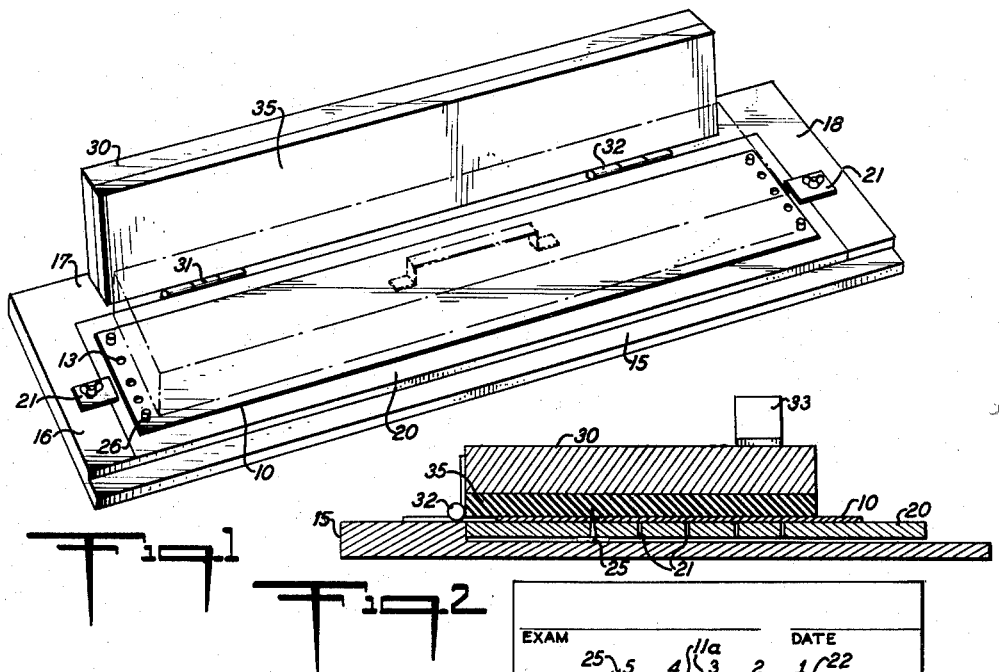
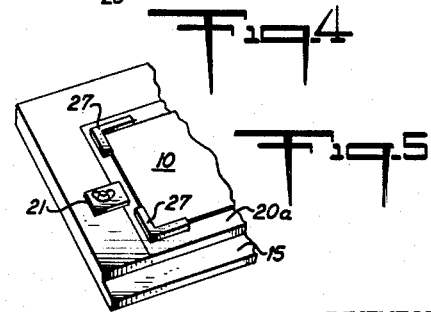
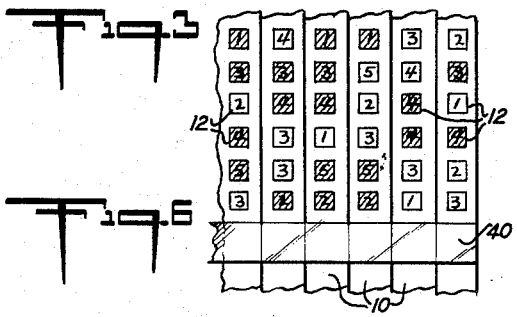
INVENTOR
CLARENCE F. WILLEY
BY Mauro & Lewis,
ATTORNEY United States Patent Office 2,936,532
Patented May 17, 1960

2,936,532

SCORING DEVICE AND METHOD

Clarence Farman Willey, Northfield, Vt.

Application June 2, 1958, Serial No. 739,066

4 Claims. (Cl. 35—48)

This invention relates to a device and method for scoring the correct answers on examination papers or the like, and for making records of the examination results.

It frequently has been recognized that self-scoring by the student in an examination derives several benefits, but this procedure has failed of adoption heretofore due to inadequate means or technique.

Among the benefits provided by the invention are quick and simple means for marking test papers which the student can employ, thus saving his teacher or examiner from a clerical burden, and giving the student the advantages of knowing the correct answers to a particular test while it is still fresh in mind.

The invention contemplates that permanent records can be made and kept, both of the correct answers to a given test, and also of the test papers arranged in a manner for ready analysis by the examiner or teacher.

The device of the invention operates by way of punching holes in one or more test papers at selected index points to indicate correct answers which are thus permanently impressed therein.

A few devices in the prior art use the system of punching correct answers in test papers. By contrast, the device of this invention is simpler and more efficient for reasons which will be made clear in the description following.

In the drawing:

Fig. 1 is a perspective view of the scoring device, with lid, when closed, shown in dotted lines;

Fig. 2 is a cross section of the device of Fig. 1;

Fig. 3 is a fragmentary plan view of a test paper for use in the scoring device;

Fig. 4 is a fragmentary view of the bottom or underside of the correct score template holding the marking pins, forming part of the scoring device;

Fig. 5 is a fragmentary perspective in reduced scale of a modified correct score template; and Fig. 6 is a fragmentary plan of a plurality of test papers assembled in overlapped or shingled condition, for analysis.

The scoring device of Figs. 1-2 is shaped to accommodate the test paper or answer sheet 10, Fig. 3, the top fragment only, being shown. Paper 10 is an elongated strip having a heading for identifying the examinee, examination, score, etc. The body of the strip is divided into five numbered columns 11 of boxes or spaces and a marginal column 12 of boxes or spaces. Each line of boxes 11 gives a five way choice of a question paper of this "multiple choice" type. The column of boxes 12 is used for summarizing the examination results, as will be further explained.

The other indicia are numbers running from 1–50, 51–100, etc., to identify the question numbers. The end margins of paper 10 are preferably perforated, as shown at 13.

The scoring device of Figs. 1-2 consists of a support or base 15 having raised shoulders 16—17—18 at three sides thus forming a receptacle for the template 20, which fits snugly but removably therein and may be secured if desired by means such as clamps 21.

Template 20 is pierced by holes or bores 22 which are spaced in rows and columns, as seen in Figs. 2 and 4, to correspond to the spacing of boxes 11 on answer strip 10. Holes 22 are further outlined at the underside of template 20 by printing around them the boxes 11a and indicating the five column numbers in reverse sequence. A marginal space is also printed for indicating the examination, date, etc., which space is more useful when the template 20 is to be kept as a correct answer record for a particular examination, and not immediately re-used for another examination.

The correct answers to an examination are entered on template 20 by means of tacks or pins, which may be simple thumb tacks as shown at 25, applied to the underside of the template (as best seen in Fig. 4) in the proper line and column. Thus, if the correct answer to the first question is the fifth selection, a tack 25 is placed in the hole 22 in the first line, fifth column, as shown in Fig. 4.

Template 20 is further provided with means to center and retain an answer sheet thereon, so that the boxes 11 are in register with the holes 22. These may be the corner pins 26, shown in Fig. 1, or the corner shoulders 27 shown in the modified template 20a, Fig. 5. Pins 26 engage the corner perforations 13 of sheet 10.

The holes 22 of the templates 20 or 20a should be drilled to a size which will hold tacks 25 in place until intentionally removed, so that a plurality of such templates with tacks in correct answer positions may be stored and reused at will for repeated marking of the examination to which they relate. The material of which the templates is made should therefore be of hardwood, plywood or preferably of masonite so that the tacks will not enlarge the holes 21 to any degree after frequent uses for different examinations.

The remaining element of the scoring device is the punching pad 30, which takes the form of a rectangular hinged member pivoted to the base 15 by hinges 31—32 in such manner that when closed, as shown in dotted lines, Fig. 1, it lies flat over and can be pressed down on template 20 and upon any examination paper or papers 10 mounted on the template. Pad 30 may carry a handle 33 and has an inner face composed of an elastic, porous layer 35 formed of a material such as rubber or collulose sponge, which permits of penetration by the tacks 25 but has good wearing qualities. Such a material may be secured to the pad 30 by a suitable adhesive.

The inner face of pad 30 should have sufficient area to cover all index positions of the template, without however, overlapping the pins 26 or the shoulders 27 (Fig. 5).

Accordingly, to operate the scoring device, a template 20 is furnished with pins 25 in the correct answer positions for a particular examination, the template placed in the cavity of base 15 defined by the shoulders 16—17—18, one or more papers 10 placed on the template, and the punching pad 30 swung closed, forcing paper 10 down upon the upstanding pins 25, impressing therein holes showing the correct answers in the boxes 11.

The scoring method which forms part of the invention involves the following steps: The student or examinee first checks, or blacks out, the box 11 in each line to record his answer to each of fifty questions (in this case each having five suggested answers, one being correct). He next marks in column 12 the number of the box he has selected in each line as indicated by the numerals one, three, and two, shown in the boxes 12, Fig. 3. The paper 10 is next placed in the scoring device and punched for the correct answers.

The paper thus punched is then further marked in the column of boxes 12 by shading or otherwise marking in boxes 12 those lines where the correct answer was made, which appears from the coincidence of a punch mark with the mark first made by the examinee in a box 11, as shown in the second line, Fig. 2, where the third choice was correct, and box 12 has been shaded in red.

By this step the entire results of the examination are transferred to the column of boxes 12 at the margin of paper 10.

In this condition, a plurality of papers 10 can be overlapped with only the boxes 12 revealed and secured together by any suitable means, such as a transparent adhesive strip 40, Fig. 6, or upon a pinboard (not shown) with pins engaging the holes 13.

The assemblage shown fragmentarily in Fig. 6 is of great use to the examiner or professor in evaluating the results of the examination at a quick glance. He can readily assess which questions were easiest, or hardest, whether certain questions consistently evoked the same incorrect answers, etc.

What is claimed is:

1. A scoring device for examination papers or the like, consisting of a base holder having a flat central area, a template consisting of a flat strip making flat contact with and resting on said flat central area, means carried by said base holder securing said template on said flat central area, said template being provided with a plurality of index positions marked by holes in said template, pins having their points protruding upwardly through said holes of said template at selected index positions, means aligning an answer sheet in fixed overlapped position over said holes and in contact with the points of said pins, and punching means forcing said answer sheet against said template for penetration of said sheet by said pins, said punching means consisting of a punching pad pivotally hinged to said base holder and swingable into flat contact with said answer sheet on said template, said pad having an elastic face penetrable by said pins, the answer sheet thereby being punctured by said pins at the selected index positions.

2. A scoring device for examination papers or the like, consisting of a flat rectangular base holder having a flat central area, a template consisting of a flat strip making flat contact on said flat central area and retained in a fixed position thereon by upstanding shoulders formed on said base holder at the edges of said flat central area, said template being provided with a plurality of index positions marked by holes in said template, pins having their points protruding upwardly through said holes of said template at selected index positions, means carried by said template aligning an answer sheet in fixed overlapped position over said holes and in contact with the points of said pins, and punching means for said answer sheet, said means consisting of a flat member pivotally hinged to a shoulder of said base holder and swingable into flat contact with said answer sheet on said template, said flat member having an inner contacting face substantially coextensive with the area of said template occupied by said holes, said inner contacting face being of an elastic material penetrable by said pins, the answer sheet thereby being punctured by said pins at the selected index positions.

3. The method of recording an examination or the like, consisting of providing an examination sheet having a central area with index positions marked thereon for recording answer choices and further marked with a marginal row of index positions equivalent to the number of questions, marking selected index positions in said central area, indicating the particular selected index position for each question in the marginal row of index positions, providing a template having holes in register with the index positions of the central area of said answer sheet, locating upstanding pins in those holes corresponding to the correct answer pattern, placing said answer sheet with the central area index positions in register with said holes, puncturing said answer sheet against said upstanding pins, and further indicating the correct answers resulting from said puncture marks in said marginal row of index positions.

4. The method according to claim 3, including the further final step of binding said examination sheets in the form of a shingled pad secured in overlapped position with only the marked marginal row of index positions of each sheet exposed.

References Cited in the file of this patent

UNITED STATES PATENTS

| | | |
|---|---|---|
| 1,860,909 | Taylor | May 31, 1932 |
| 2,137,447 | Ellis | Nov. 22, 1938 |
| 2,142,419 | Strongman | Jan. 3, 1939 |
| 2,304,234 | Bliss | Dec. 8, 1942 |

FOREIGN PATENTS

| | | |
|---|---|---|
| 396,022 | France | Jan. 14, 1909 |